(12) United States Patent
He et al.

(10) Patent No.: US 9,385,445 B2
(45) Date of Patent: Jul. 5, 2016

(54) COMPOSITE INTELLIGENT TERMINAL WIRING DEVICE AND PLUG DEVICE

(71) Applicants: STATE GRID CORPORATION OF CHINA (SGCC), Beijing (CN); STATE GRID CHONGQING ELECTRIC POWER CO. ELECTRIC POWER RESEARCH INSTITUTE, Chongqing (CN)

(72) Inventors: Guojun He, Chongqing (CN); Xingzhe Hou, Chongqing (CN); Yingying Cheng, Chongqing (CN); Huaxiao Yang, Chongqing (CN); Ji Xiao, Chongqing (CN); Jianming Hu, Chongqing (CN); Ke Zheng, Chongqing (CN); Xiaorui Hu, Chongqing (CN); Xiyang Ou, Chongqing (CN); Jing Liu, Chongqing (CN)

(73) Assignees: STATE GRID CORPORATION OF CHINA (SGCC), Beijing (CN); STATE GRID CHONGQING ELECTRIC POWER CO. ELECTRIC POWER RESEARCH INSTITUTE, Chongqing (CN)

( * ) Notice: Subject to any disclaimer, the term of this patent is extended or adjusted under 35 U.S.C. 154(b) by 0 days.

(21) Appl. No.: 14/385,099

(22) PCT Filed: Sep. 10, 2013

(86) PCT No.: PCT/CN2013/083186
§ 371 (c)(1),
(2) Date: Sep. 12, 2014

(87) PCT Pub. No.: WO2014/040523
PCT Pub. Date: Mar. 20, 2014

(65) Prior Publication Data
US 2015/0180140 A1 Jun. 25, 2015

(30) Foreign Application Priority Data

| Sep. 13, 2012 | (CN) | 2012 2 0465859 |
| Dec. 21, 2012 | (CN) | 2012 2 0711495 |
| Dec. 21, 2012 | (CN) | 2012 2 0711690 |
| Dec. 27, 2012 | (CN) | 2012 2 0731931 |

(51) Int. Cl.
| H02B 1/01 | (2006.01) |
| H01R 9/00 | (2006.01) |
| H02B 1/00 | (2006.01) |
| H01H 1/00 | (2006.01) |
| H01R 9/24 | (2006.01) |
| H01R 13/703 | (2006.01) |
| H02B 1/056 | (2006.01) |

(52) U.S. Cl.
CPC . *H01R 9/00* (2013.01); *H01H 1/00* (2013.01); *H01R 9/2491* (2013.01); *H01R 13/7034* (2013.01); *H02B 1/00* (2013.01); *H02B 1/056* (2013.01)

(58) Field of Classification Search
USPC .............. 361/832, 728–730, 752, 796, 800; 439/76.1
See application file for complete search history.

(56) References Cited

U.S. PATENT DOCUMENTS

| 4,689,721 A * | 8/1987 | Damerow | H01R 23/70 361/707 |
| 5,772,452 A * | 6/1998 | Aoyama | H01R 12/73 439/74 |
| 6,358,093 B1 * | 3/2002 | Phommachanh | H01R 24/64 439/188 |
| 7,241,181 B2 * | 7/2007 | Machado | H01R 13/514 439/541.5 |
| 7,548,434 B2 * | 6/2009 | Busse | H01R 13/6658 361/826 |
| 7,898,819 B2 * | 3/2011 | Pfingsten | H01R 13/514 361/730 |
| 8,449,332 B2 * | 5/2013 | Purkis | H01R 24/64 439/620.06 |

FOREIGN PATENT DOCUMENTS

| CN | 2824059 Y | 10/2006 |
|---|---|---|
| CN | 201060217 Y | 5/2008 |
| CN | 202231192 U | 5/2012 |
| CN | 202854191 U | 4/2013 |
| JP | 2001165960 A | 6/2001 |
| JP | 2001330629 A | 11/2001 |
| JP | 2002048819 A | 2/2002 |
| JP | 2003248020 A | 9/2003 |

OTHER PUBLICATIONS

International Search Report and Written Opinion of the ISA, ISA/CN, Beijing, mailed Dec. 19, 2013.

* cited by examiner

*Primary Examiner* — Hung S Bui

(74) *Attorney, Agent, or Firm* — Harness, Dickey & Pierce, P.L.C.

(57) ABSTRACT

A combined-type intelligent terminal wiring device and a plug device are provided. The wiring device includes a top wiring terminal board, a bottom wiring terminal board and a combined-type socket. An interior of each terminal of the combined-type socket has a spring-leaf structure, and each spring leaf includes an upper spring leaf and a lower spring leaf which are conductively connected via a contact surface. The top wiring terminal board has one end configured to connect the upper spring leaf, and the bottom wiring terminal board has one end configured to connect the lower spring leaf. The plug device includes a plug and a wiring terminal, the plug is located at a front end of the plug device and is a conductive metallic sheet, and the wiring terminal is located at a rear end of the plug device and has one end connected to the conductive metallic sheet.

10 Claims, 4 Drawing Sheets

COMPOSITE INTELLIGENT TERMINAL WIRING DEVICE AND PLUG DEVICE

CROSS REFERENCE TO RELATED APPLICATIONS

The present application is the national phase of International Application No. PCT/CN2013/083186, titled "COMPOSITE INTELLIGENT TERMINAL WIRING DEVICE AND PLUG DEVICE", filed on Sep. 10, 2013, which claims the benefit of priorities to Chinese Patent Application No. 201220465859.6, titled "COMBINED-TYPE INTELLIGENT TERMINAL WIRING DEVICE", filed with the Chinese State Intellectual Property Office on Sep. 13, 2012, Chinese Patent Application No. 201220711495.5, titled "INTEGRATED INTELLIGENT CONNECTING PLUG FOR CALIBRATION", filed with the Chinese State Intellectual Property Office on Dec. 21, 2012, Chinese Patent Application No. 201220711690.8, titled "COMBINED-TYPE INTELLIGENT TERMINAL JUNCTION BOX", filed with the Chinese State Intellectual Property Office on Dec. 21, 2012, and Chinese Patent Application No. 201220731931.5, titled "COMBINED-TYPE INTELLIGENT TERMINAL WIRING DEVICE", filed with the Chinese State Intellectual Property Office on Dec. 27, 2012, the entire disclosures of which are incorporated herein by reference.

FIELD

The present application relates to the technical field of electrical equipment, in particular to a combined-type intelligent terminal wiring device and plug device.

BACKGROUND

At present, a joint wiring terminal box is widely used, wherein screws and metal sheets are connected in a slip-on manner. To ensure a current circuit to stay in a short-circuit condition (not short-circuited), relevant regulation operations should be strictly implemented, which has a high requirement for the operators, and even in this case, misoperations and wiring mistakes still occur. Furthermore, since metallic terminals are exposed, it is required to manually switch the metallic terminals to change the wirings of the current secondary circuit or to short-circuit the secondary current, which has a large potential safety hazard, and many safety accidents happened in the past.

In the electrical system, as a legal measurement meter, an electric energy meter used for trade settlement has to be periodically calibrated. In a conventional calibration method, current or voltage metallic connecting pieces at an electric energy meter panel, where a conventional joint wiring terminal box is mounted, are switched or connected in parallel to perform an error comparison under real load in the same measurement secondary circuit between a standard meter, having an accuracy standard higher than that of the electric energy meter to be calibrated, and the electric energy meter mounted in the filed. However, during the process of connecting the standard meter into the measurement secondary circuit, situations that causing harm to the human body and damages to equipments may happed, for example, a current secondary circuit being opened or a voltage secondary circuit being short-circuited may be caused when switching the current metallic connecting pieces or picking up voltage signals.

A technical issue to be addressed by those skilled in the art is to provide a wiring device which may not only ensure the operational safety but also improve the work efficiency.

SUMMARY

The present application provides a combined-type intelligent terminal wiring device and a plug device which may not only ensure safety but also improve the working efficiency.

A combined-type intelligent terminal wiring device is provided according to an embodiment of the present application, wherein the wiring device is of a box-shaped structure and includes a top wiring terminal board, a bottom wiring terminal board and a combined-type socket arranged laterally;

terminals of the top wiring terminal board, the bottom wiring terminal board and the combined-type socket are in a one-to-one correspondence, and all of the terminals are insulated from each other;

an interior of each terminal of the combined-type socket has a spring-leaf structure, and each spring leaf includes an upper spring leaf and a lower spring leaf, and the upper spring leaf and the lower spring leaf are conductively connected via a contact surface;

the top wiring terminal board has one end configured to connect the upper spring leaf of the combined-type socket; and the bottom wiring terminal board has one end configured to connect the lower spring leaf of the combined-type socket.

Preferably, each terminal of the combined-type socket is provided with at least two groups of spring leafs arranged in parallel.

Preferably, each terminal of the combined-type socket is provided with two groups of spring leafs arranged in parallel; and the upper spring leaf of the two groups of spring leafs is bent to form a front contact surface and a rear contact surface, and the lower spring leaf of the two groups of spring leafs is bent to form a front contact surface and a rear contact surface, and the front contact surfaces of the upper spring leaf and the lower spring leaf are conductively connected, and the rear contact surfaces of the upper spring leaf and the lower spring leaf are conductively connected.

Preferably, the combined-type socket is adapted to a three-phase three-wire system or a three-phase four-wire system.

Preferably, the top wiring terminal board has another end configured to connect a trade settlement electric energy meter or a normal electric energy meter; and the bottom wiring terminal board has another end configured to connect a secondary measurement circuit.

A plug device corresponding to the combined-type intelligent terminal wiring device is further provided according to the present application, and the plug device includes a plug and a wring terminal;

the plug is located at a front end of the plug device and is a conductive metallic sheet; and the wiring terminal is located at a rear end of the plug device and has one end connected to the conductive metallic sheet.

Preferably, the conductive metallic sheet is of a planar structure having three layers, wherein an upper layer and a lower layer are both a conductive metallic sheet and an intermediate layer is an insulating layer; and the conductive metallic sheets at the upper layer and the lower layer are both connected to one end of the wiring terminal; and another end of the wiring terminal is configured to connect an external calibration standard meter.

Preferably, the plug device further includes a safety shield, wherein the safety shield is made by insulating material; and the safety shield is configured to cover the wiring terminal.

Preferably, the conductive metallic sheet is copper sheet.

Compared with the conventional technology, the present application has the following advantages.

The combined-type intelligent terminal wiring device according to the embodiment of the present application may realize a great connection, wherein another end of the top wiring terminal board is connected with a trade settlement electric energy meter or a normal electric energy meter, and another end of the bottom wiring terminal board is connected with a measurement secondary circuit. An external calibration standard meter may be plugged in the combined-type socket arranged laterally, which is convenient to use and easy to calibrate. A real-time calibration may be realized by the pluggable structure. The wiring device may be used once it is installed and it is not required to change the wiring as in the conventional technology, and no terminal is exposed, thus it is safer. Further, electricity stealing by changing the measurement secondary circuit may be prevented due to the closed structure and the unique connection manner of the wiring device.

BRIEF DESCRIPTION OF THE DRAWINGS

For more clearly illustrating embodiments of the present application or the technical solution in the conventional technology, drawings referred to describe the embodiments or the conventional technology is briefly described hereinafter. Apparently, the drawings in the following description are only several embodiments of the present application, and for those skilled in the art other drawings may be obtained based on these drawings without any creative efforts.

DETAILED DESCRIPTION OF THE EMBODIMENTS

The technical solutions in the embodiments of the present application are described clearly and completely hereinafter in conjunction with the drawings in the embodiments of the present application. Apparently, the described embodiments are only a few of but not all embodiments of the present application. Based on the embodiments in the present application, all of other embodiments, made by the person skilled in the art without any creative efforts, fall into the scope of the present application.

For making the objects, features and advantages of the present application more clear and understandable, the specific implementing manners of the present application are described in detail in conjunction with drawings.

Figure 1:
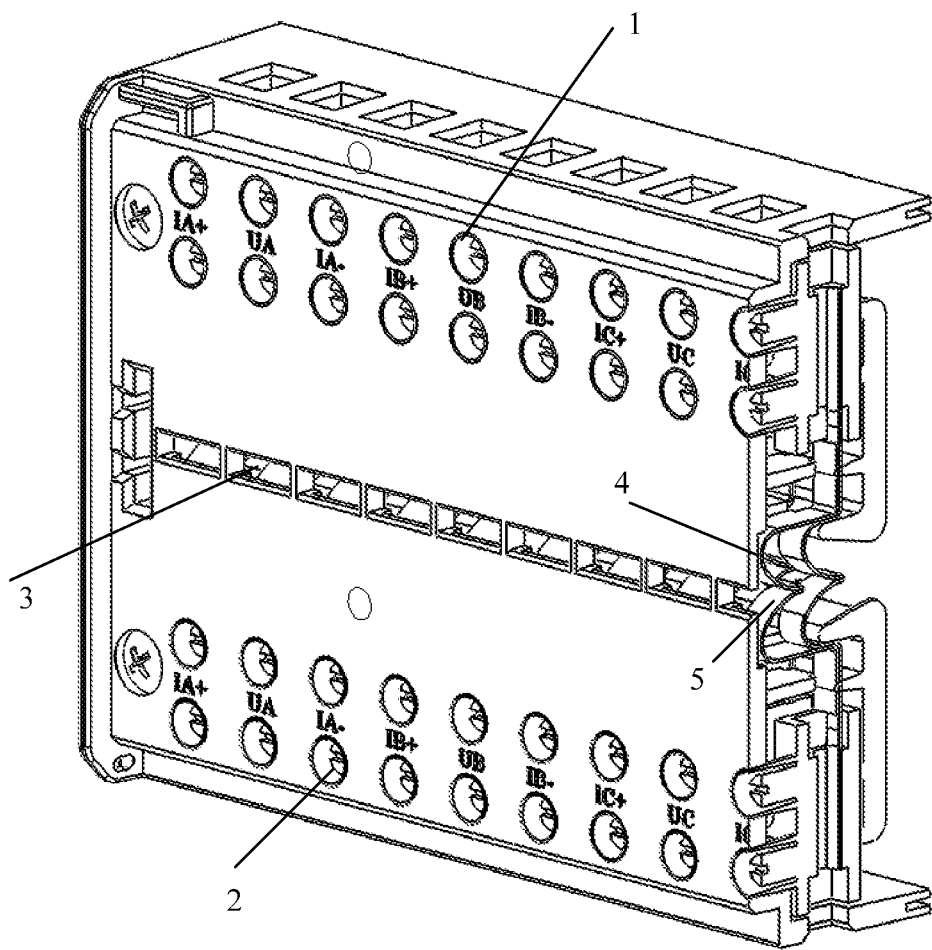
FIG. 1 is a perspective view of a combined-type intelligent terminal wiring device according to the present application.

Reference is made to FIG. 1, which is a perspective view of a combined-type intelligent terminal wiring device according to the present application.

A combined-type intelligent terminal wiring device is provided in this embodiment, and as shown in FIG. 1, the wiring device is of a box-shaped structure and includes a top wiring terminal board 1, a bottom wiring terminal board 2 and a combined-type socket 3 arranged laterally.

Terminals of the top wiring terminal board 1, the bottom wiring terminal board 2 and the combined-type socket 3 are in a one-to-one correspondence, and all of the terminals are insulated from each other.

It is to be noted that, the terminals being in a one-to-one correspondence refers to that the positions and numbers of the terminals are all in a one-to-one correspondence.

For example, in a case that the combined-type intelligent terminal wiring device is adapted to an electric energy meter of a three-phase four-wire system, the top wiring terminal board 1, the bottom wiring terminal board 2 and the combined-type socket 3 are each provided with ten terminals, and the ten terminals include six terminals for a three-phase current, wherein current of each phase is provided with an input terminal and an output terminal; three terminals respectively provided for voltages of A, B and C phases, and one terminal for N wire. Of cause, more terminals may be provided as spare according to requirements. The specific number of the terminals is not limited in this embodiment of the present application. It can be understood that the wiring device is also adapted to a three-phase three-wire system.

An interior of each terminal of the combined-type socket has a spring-leaf structure, and each spring leaf includes an upper spring leaf and a lower spring leaf. The upper spring leaf and the lower spring leaf are conductively connected via a contact surface;

one end of the top wiring terminal board is configured to connect the upper spring leaf of the combined-type socket; and one end of the bottom wiring terminal board is configured to connect the lower spring leaf of the combined-type socket.

The combined-type intelligent terminal wiring device according to the embodiment of the present application may realize a great connection, wherein another end of the top wiring terminal board is connected with a trade settlement electric energy meter or a normal electric energy meter, and another end of the bottom wiring terminal board is connected with a measurement secondary circuit. An external calibration standard meter may be plugged in the combined-type socket arranged laterally, which is convenient to use and easy to calibrate. A real-time calibration may be realized by the pluggable structure. The wiring device may be used once it is installed and it is not required to change the wiring as in the conventional technology, and no terminal is exposed, thus it is safer. Further, electricity stealing by changing the measurement secondary circuit may be prevented due to the closed structure and the unique connection manner of the wiring device.

The spring-leaf structure of the combined-type socket according to the embodiment of the present application is described hereinafter in conjunction with a sectional view.

Reference is still made to FIG. 1.

It is to be noted that, in this embodiment, each terminal of the combined-type socket includes at least two groups of spring leafs, wherein the at least two groups of spring leafs are arranged in parallel.

Each terminal of the combined-type socket having two groups of spring leafs arranged in parallel is introduced as an example hereinafter. It can be understood that, each terminal of the combined-type socket may also be provided with three groups, four groups or five groups of the spring leafs, as long as a number of the groups of the spring leafs in each terminal is greater than or equal to two.

As shown in FIG. 1, each terminal of the combined-type socket is provided with two groups of spring leafs arranged in parallel.

It should be noted that, each group of spring leafs in the present application refers to a pair of the upper spring leaf 4 and the lower spring leaf 5, and the upper spring leaf and the lower spring leaf has normally-closed contacts, that is, are conductively contacted with each other.

An implementation manner of a double-spring-leaf structure according to the present application is described hereinafter in conjunction with the schematic view of the double-spring-leaf in FIG. 1. Reference is made to FIG. 1.

In this embodiment, for facilitating production and manufacture, the upper spring leafs in the two groups of spring leafs may be integrated together, the lower spring leafs in the two groups of spring leafs may be integrated together, and the upper spring leafs and the lower spring leafs are each formed by one piece of spring leaf, that is, the upper spring leaf 4 is bent to form a front contact surface and a rear contact surface, and the lower spring leaf 5 is bent to form a front contact surface and a rear contact surface. In fact, an intermediate portion between the front spring leaf and the rear spring leaf of the double-spring-leaf structure shown in FIG. 1 may be disconnected, that is, the two upper spring leafs may be disconnected and the two lower spring leafs may be disconnected.

In the solution that the upper spring leaf and the lower spring leaf of the two groups of spring leafs are respectively bent to form a front contact surface and a rear contact surface, the front contact surfaces of the upper spring leaf 4 and the lower spring leaf 5 are conductively connected, and the rear contact surfaces of the upper spring leaf 4 and the lower spring leaf 5 are conductively connected.

The advantages of arranging the double-spring-leaf structure in the present application are described hereinafter.

In the field calibration and collection for current signal, a series connection manner is employed, wherein the current signal is connected to a voltage input terminal of the external calibration standard meter in series. When a plug terminal of the external calibration standard meter is inserted, the upper spring leaf and the lower spring leaf are respectively connected to a current input terminal and a current output terminal of the external calibration standard meter via wires. When the plug terminal pushes the first group of spring leafs apart from each other, the current signal is diverted to the external calibration standard meter, and the second group of spring leafs still stays in contact with each other to maintain the trade settlement electric energy meter or the normal electric energy meter to obtain the current signal normally Then, the plug terminal is inserted forward further, pushing the second group of spring leafs apart from each other, and at this time, the electricity signal is fully switched to the external calibration standard meter, and then flows toward the trade settlement electric energy meter or the normal electric energy meter, and the trade settlement electric energy meter or the normal electric energy meter is maintained to obtain the current signal constantly, as well as the external calibration standard meter. The current signal may always stay in a conducted state in the whole process, that is, the current will not be disconnected.

Similar to the current calibration, a parallel connection manner is employed in the field calibration and collection for a voltage signal, wherein the voltage signal is connected in parallel to a voltage input terminal of the external calibration standard meter. During the process of inserting a plug terminal of the external calibration standard meter, the upper spring leaf and the lower spring leaf are connected in parallel via a voltage short-circuit wire, the voltage signal is transmitted to the voltage input terminal of the external calibration standard meter, and then the first group of spring leafs and the second group of spring leafs are both pushed apart from each other in sequence. Due to such structure, the voltage signal may be constantly transmitted to the trade settlement electric energy meter or the normal electric energy meter, and the external calibration standard meter may collect the voltage signal. The voltage signal may always stay in a conducted state in the whole process, that is, the voltage will not be disconnected.

Preferably, the combined-type intelligent terminal wiring device is provided with ten groups of spring leafs, and the upper spring leaf and the lower spring leaf in each group of spring leafs are conductively connected in a normal working state, and the current or voltage signal from the secondary measurement circuit may directly flow toward the trade settlement electric energy meter or the normal electric energy meter via the spring leafs.

Based on the combined-type intelligent terminal wiring device according to the above embodiments, the present application further provides a plug device corresponding to the wiring device, and the plug device is configured to be inserted in the wiring device so as to calibrate the trade settlement electric energy meter or the normal electric energy meter via the external calibration standard meter.

Figure 2:
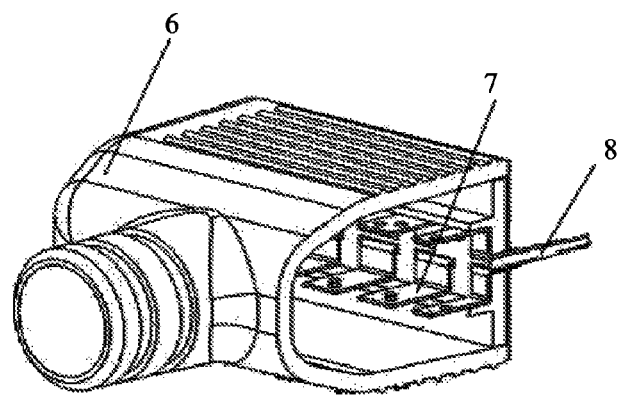
FIG. 2 is a perspective view of a plug device according to the present application.

Reference is made to FIG. 2, which is a perspective view of a plug device according to the present application.

The plug device according to this embodiment includes a plug 8 and a wiring terminal 7.

The plug 8 is located at a front end of the plug device and is a conductive metallic sheet.

The wiring terminal 7 is located at a rear end of the plug device and has one end connected to the conductive metallic sheet.

It should be noted that, the plug device according to this embodiment is used together with the wiring device as shown in FIG. 1. The plug device may be inserted into the combined-type socket of the wiring device, that is, the plug 8 is inserted into the terminal of the combined-type socket. In this manner, the trade settlement electric energy meter or the normal electric energy meter may be calibrated by the external calibration standard meter. The operation of the plug device is convenient, easy, safe and reliable, and only requires an inserting action.

Reference is still made to FIG. 2. The plug device according to this embodiment may further include a safety shield 6 made by insulating material.

The safety shield 6 is configured to cover the wiring terminal 7. The safety shield 6 may have an electrical isolation function, thereby protecting the operator's safety.

The plug according to the embodiments of the present application is described hereinafter in detail in conjunction with FIGS. 3 and 4.

Figure 3:
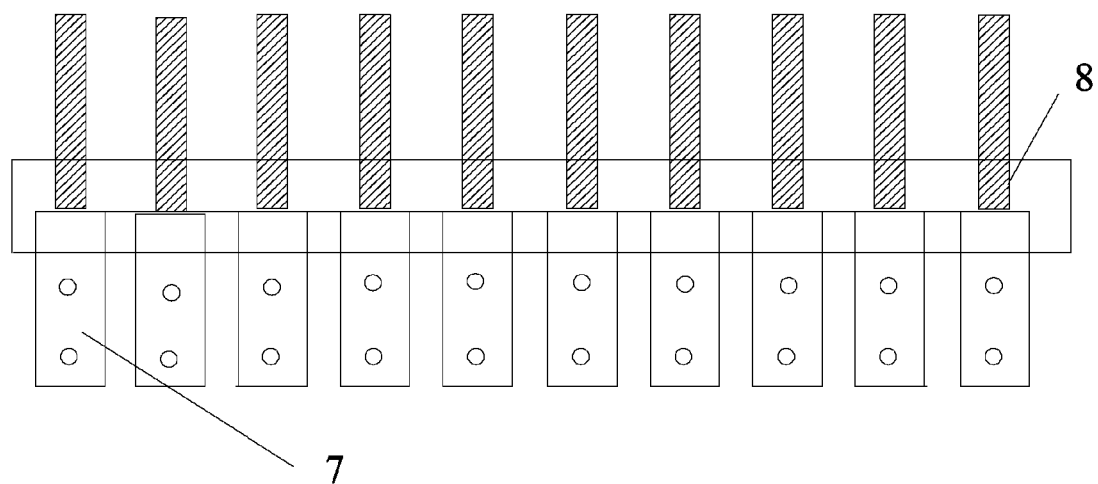
FIG. 3 is a top view of a plug according to an embodiment of the present application.
Figure 4:
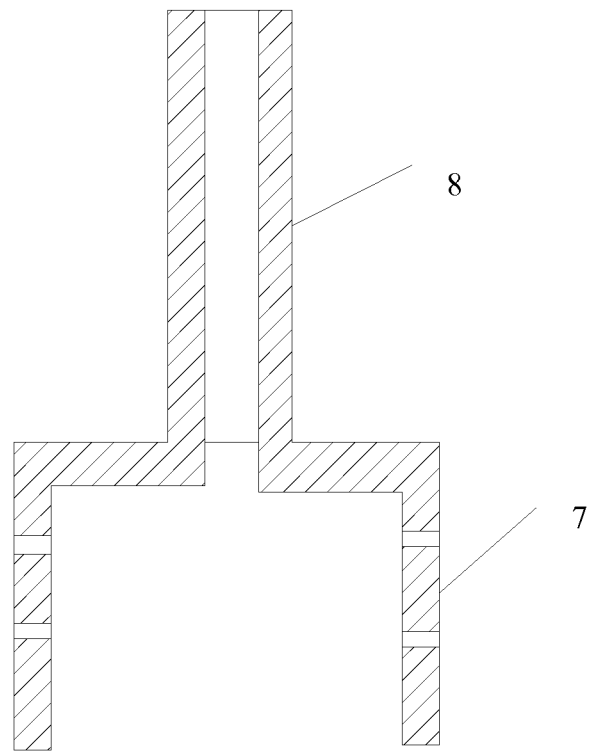
FIG. 4 is a side view of the plug according to the embodiment of the present application.

Reference is made to FIG. 3, which is a top view of the plug according to the embodiment of the present application.

Reference is made to FIG. 3, which is a side view of the plug according to the embodiment of the present application.

The plug 8 is generally made of conductive metallic sheet, and as shown in the figures, the plug 8 is of a planar structure having three layers, wherein an upper layer and a lower layer are both a conductive metallic sheet and an intermediate layer is an insulating layer;

the conductive metallic sheets at the upper layer and the lower layer are both connected to one end of the wiring terminal 7; and another end of the wiring terminal 7 is connected to an external calibration meter.

Preferably, the conductive metallic sheet is a copper sheet.

The plug device does not include a voltage short-circuit wire, and the upper copper sheet and the lower copper sheet are insulated from each other and are in disconnected state. After the plug is inserted into the combined-type intelligent terminal wiring device, only the lower copper sheet is in contact with lower ends of the double spring leafs to maintain the voltage signal to be transmitted from the secondary measurement circuit, and the upper copper sheet is disconnected from the trade settlement electric energy meter or the normal electric energy meter, thus no voltage signal is transmitted, which ensures that there is no electric shock risk when the operator screws the metallic screw to assemble or disassemble a gateway electric energy meter, thereby ensuring the life safety of the operator.

The current circuit of the plug device includes a current short-circuit wire configured to switch the current circuit. In a normal operation, the current signal from the secondary measurement circuit flows in a current input terminal of the combined-type intelligent terminal wiring device, and flows toward the current input terminal of the trade settlement electric energy meter or the normal electric energy meter, and then flows back to the secondary measurement circuit from an output terminal of the trade settlement electric energy meter or the normal electric energy meter through the combined-type intelligent terminal wiring device, thus the whole circuit is a completed current loop.

In an operation of switching meters, the current signal does not flow through the trade settlement electric energy meter or the normal electric energy meter and only flows through an inside of the combined-type intelligent terminal wiring device, thus the lower copper sheets of the current input terminal and the current output terminal of the plug are short circuited via a current short-circuit wire, such that the current signal from the secondary measurement circuit may flow through the lower copper sheets, and the upper portion of the plug which is configured to connect the trade settlement electric energy meter or the normal electric energy meter are disconnected. The current signal of the secondary measurement circuit constantly stays in a conducted state in the whole process, that is, the current will not be disconnected.

Figure 5:
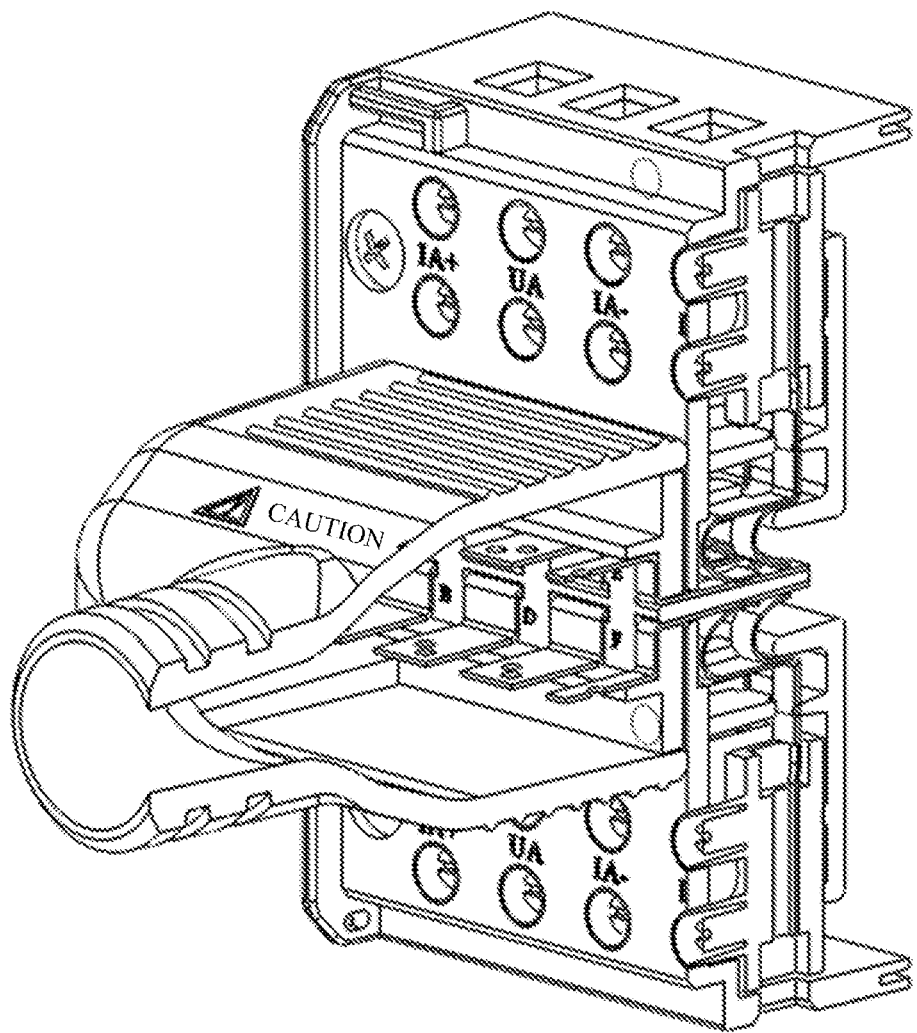
FIG. 5 is a schematic view showing the plug device according to the embodiment of the present application being inserted in the wiring device.

Reference is made to FIG. 5, which is a schematic view showing the plug device being inserted in the wiring device.

The combined-type intelligent terminal wiring device and the plug device according to the above embodiments of the present application may simplify operation procedures in the live-wire operation for the operators, and ensure the safe operation of the electrical production from the technology improvement view, which has effects of labor-saving, time-saving and ensuring the safe production.

The embodiments described hereinabove are only preferred embodiments of the present application, and are not intended to limit the scope of the present application in any form. Although the present application is disclosed by the above preferred embodiments, the preferred embodiments should not be interpreted as a limitation to the present application. For the person skilled in the art, many variations, modifications or equivalent replacements may be made to the technical solutions of the present application by using the methods and technical contents disclosed hereinabove, without departing from the scope of the technical solutions of the present application. Therefore, any simple modifications, equivalent replacements and modifications, made to the above embodiments based on the technical essences of the present application without departing from the technical solutions of the present application, are deemed to fall into the scope of the technical solution of the present application.

What is claimed is:

1. A combined-type intelligent terminal wiring device, wherein the wiring device is of a box-shaped structure and comprises a top wiring terminal board, a bottom wiring terminal board and a combined-type socket arranged laterally;
   terminals of the top wiring terminal board, the bottom wiring terminal board and the combined-type socket are in a one-to-one correspondence, and all of the terminals are insulated from each other;
   an interior of each terminal of the combined-type socket has a spring-leaf structure, and each spring leaf comprises an upper spring leaf and a lower spring leaf, and the upper spring leaf and the lower spring leaf are conductively connected via a contact surface;
   the top wiring terminal board has one end configured to connect the upper spring leaf of the combined-type socket; and
   the bottom wiring terminal board has one end configured to connect the lower spring leaf of the combined-type socket;
   wherein each terminal of the combined-type socket is provided with two groups of spring leafs arranged in parallel; and
   the upper spring leaf of the two groups of spring leafs is bent to form a front contact surface and a rear contact surface, and the lower spring leaf of the two groups of spring leafs is bent to form a front contact surface and a rear contact surface, and the front contact surfaces of the upper spring leaf and the lower spring leaf are conductively connected, and the rear contact surfaces of the upper spring leaf and the lower spring leaf are conductively connected.

2. The combined-type intelligent terminal wiring device according to claim 1, wherein the combined-type socket is adapted to a three-phase three-wire system or a three-phase four-wire system.

3. The combined-type intelligent terminal wiring device according to claim 2, wherein the top wiring terminal board has another end configured to connect a trade settlement electric energy meter or a normal electric energy meter; and
   the bottom wiring terminal board has another end configured to connect a secondary measurement circuit.

4. The combined-type intelligent terminal wiring device according to claim 1, wherein the top wiring terminal board has another end configured to connect a trade settlement electric energy meter or a normal electric energy meter; and
   the bottom wiring terminal board has another end configured to connect a secondary measurement circuit.

5. A plug device corresponding to the combined-type intelligent terminal wiring device according to claim 1, comprising a plug and a wiring terminal;
   the plug is located at a front end of the plug device and is a conductive metallic sheet; and
   the wiring terminal is located at a rear end of the plug device and has one end connected to the conductive metallic sheet.

6. The plug device according to claim 5, wherein the conductive metallic sheet is of a planar structure having three layers, wherein an upper layer and a lower layer are both a conductive metallic sheet and an intermediate layer is an insulating layer;
   the conductive metallic sheets at the upper layer and the lower layer are both connected to one end of the wiring terminal; and another end of the wiring terminal is configured to connect an external calibration standard meter.

7. The plug device according to claim 5, further comprising a safety shield, wherein the safety shield is made by insulating material; and the safety shield is configured to cover the wiring terminal.

8. The plug device according to claim 5, wherein the conductive metallic sheet is copper sheet.

9. The plug device according to claim 6, further comprising a safety shield, wherein the safety shield is made by insulating material; and the safety shield is configured to cover the wiring terminal.

10. The plug device according to claim 6, wherein the conductive metallic sheet is copper sheet.

* * * * *